United States Patent
Rudin et al.

[11] Patent Number: 6,014,722
[45] Date of Patent: Jan. 11, 2000

[54] DATA COMMUNICATION SYSTEM FOR CONTROLLING PRIORITIZATION AND TRANSFER OF DATA AND METHOD THEREFOR

[75] Inventors: Yehuda Rudin, Netanya; Yoram Yeivin, Petach-Tikva; Eliezer Weitz, Hulon, all of Israel

[73] Assignee: Motorola, Inc., Schaumburg, Ill.

[21] Appl. No.: 08/858,439

[22] Filed: May 19, 1997

Related U.S. Application Data

[63] Continuation of application No. 08/598,414, Feb. 8, 1996, abandoned, which is a continuation of application No. 08/223,343, Apr. 4, 1994, abandoned.

[30] Foreign Application Priority Data

May 4, 1993 [GB] United Kingdom .................... 9309168

[51] Int. Cl.[7] .............................. G06F 13/00; G06F 13/14
[52] U.S. Cl. ........................... 710/240; 710/57; 370/447; 340/825.51
[58] Field of Search ................................... 710/240, 244, 710/107, 5, 39, 52, 57; 370/447, 455; 340/825.5, 825.51

[56] References Cited

U.S. PATENT DOCUMENTS

| | | | |
|---|---|---|---|
| 3,699,530 | 10/1972 | Capowski et al. | 395/275 |
| 4,271,468 | 6/1981 | Christensen et al. | 395/275 |
| 4,272,815 | 6/1981 | Kadowaki et al. | 395/250 |
| 4,378,588 | 3/1983 | Katzman et al. | 395/275 |
| 4,630,261 | 12/1986 | Irvin | 370/81 |
| 4,631,668 | 12/1986 | Kubo et al. | 364/200 |
| 4,878,218 | 10/1989 | Takada | 370/94.1 |
| 4,897,833 | 1/1990 | Kent et al. | 370/85.2 |
| 5,072,420 | 12/1991 | Conley et al. | 395/877 |
| 5,088,025 | 2/1992 | Fujimoto | 395/872 |
| 5,164,939 | 11/1992 | Shobatake | 370/60 |
| 5,301,279 | 4/1994 | Riley et al. | 395/275 |
| 5,369,747 | 11/1994 | Muranoi | 395/250 |

FOREIGN PATENT DOCUMENTS 2225462A 5/1990 United Kingdom ............ G06F 13/00

*Primary Examiner*—Gopal C. Ray

[57] ABSTRACT

A data communication system (2) provides a circuit and method for prioritizing and controlling the transfer of data to and from a plurality of communication channels (6–11). The data communication system defines a predetermined data threshold level (X,Y) for a data buffer (16–21) for each of the plurality of communication channels. A service request signal is generated for a one of the plurality of communication channels when a respective data buffer stores data to be transferred. The data communication system generates a threshold signal for a communication channel when a data value stored in a respective data buffer reaches a predetermined data threshold level of the data buffer. The priority levels of the communication channels which generate threshold and service request signals are then compared to determine a high priority communication channel. The highest priority communication channel is then serviced.

11 Claims, 2 Drawing Sheets

DATA COMMUNICATION SYSTEM FOR CONTROLLING PRIORITIZATION AND TRANSFER OF DATA AND METHOD THEREFOR

This application is a continuation of prior patent application Ser. No. 08/598,414 filed Feb. 8, 1996, abandoned which is a continuation of prior patent application Ser. No. 08/223,343 filed Apr. 4, 1994, now abandoned.

FIELD OF THE INVENTION

This invention relates to a data communication system and a method of prioritizing and controlling the transfer of data to and from a plurality of communication channels of the data communication system.

BACKGROUND OF THE INVENTION

In serial data communication systems, data is transferred between a serial communication bus and devices, such as memory, terminals, under the control of a controlling processor. In order to ensure efficient data transfer, typically a plurality of communication channels are utilised for queuing data. A common method of managing the data queues is to map each queue into one of a plurality of First-In-First-Out (FIFO) memories.

In systems which are served by one processor, the plurality of communication channels are prioritized; a communication channel having a higher priority than another communication channel will be serviced by the one processor before the lower priority communication channels. Typically, the lower priority communication channels require larger FIFO memories, since the lower priority communication channels are serviced only after the higher priority communication channels have been serviced. The larger FIFO memories require greater silicon area which can be a significant disadvantage in some applications. Another disadvantage with such a priority scheme is that the design of the communication channels varies according to their respective priorities and so its implementation is not straight forward. Also, the speed of such priority schemes is limited.

Round Robin priority schemes which prioritize the servicing of the communication channels are also well known. Although such schemes allow the communication channels to be identical which helps to simplify the design, Round Robin schemes are significantly more complex to implement. A further disadvantage is that the Round Robin priority scheme is not suitable for some applications. For example, in applications where some communication channels need higher priority than the other communication channels in the communication system. This is the case when the communication channels support different data rates.

SUMMARY OF THE INVENTION

In accordance with a first aspect of the present invention there is provided a method of prioritizing and controlling the transfer of data to and from a plurality of communication channels of a data communication system, each communication channel comprising data buffer means for holding data to be transferred, the method comprising the steps of:

assigning a different priority level to each one of the plurality of communication channels;

defining a predetermined data threshold level for the data buffer means of each communication channel;

generating a service request signal for a communication channel when the respective data buffer means holds data to be transferred;

generating a threshold signal for a communication channel when the data held in the respective data buffer means reaches the predetermined data threshold level of the data buffer means;

comparing the priority levels of the communication channels which generate threshold signals and service request signals to determine the highest priority communication channel; and servicing the determined highest priority communication channel having a threshold signal generating data buffer means whereby data is transferred thereto or therefrom.

In accordance with a second aspect of the present invention there is provided a data communication system comprising:

a control processor;

a plurality of peripheral devices;

a plurality of communication channels for transferring data between the control processor and the plurality of peripheral devices, each communication channel of the plurality of communication channels being assigned a predetermined priority level and comprising:

data buffer means for holding data to be transferred, the data buffer means of each of the communication channels being assigned a predetermined data threshold level, means for generating a service request signal when the data buffer means holds data to be transferred, and means for generating a threshold signal having a first logic value when the data held in the data buffer means reaches the predetermined data threshold level; and logic means coupled to receive the service request signals, the priority levels and the threshold signals of each of the plurality of communication channels for comparing the priority levels of the communication channels which generate service request signals and threshold signals to determine the highest priority communication channel and to indicate to the control processor the determined communication channel such that the control processor services the determined highest priority communication channel to transfer data thereto or therefrom.

BRIEF DESCRIPTION OF THE DRAWINGS

A data communication system and method of prioritising and controlling the transfer of data to and from a plurality of communication channels of the data communication system in accordance with the present invention will now be described, by way of example only, with reference to the accompanying drawings in which.

DETAILED DESCRIPTION OF THE DRAWINGS

Figure 1:
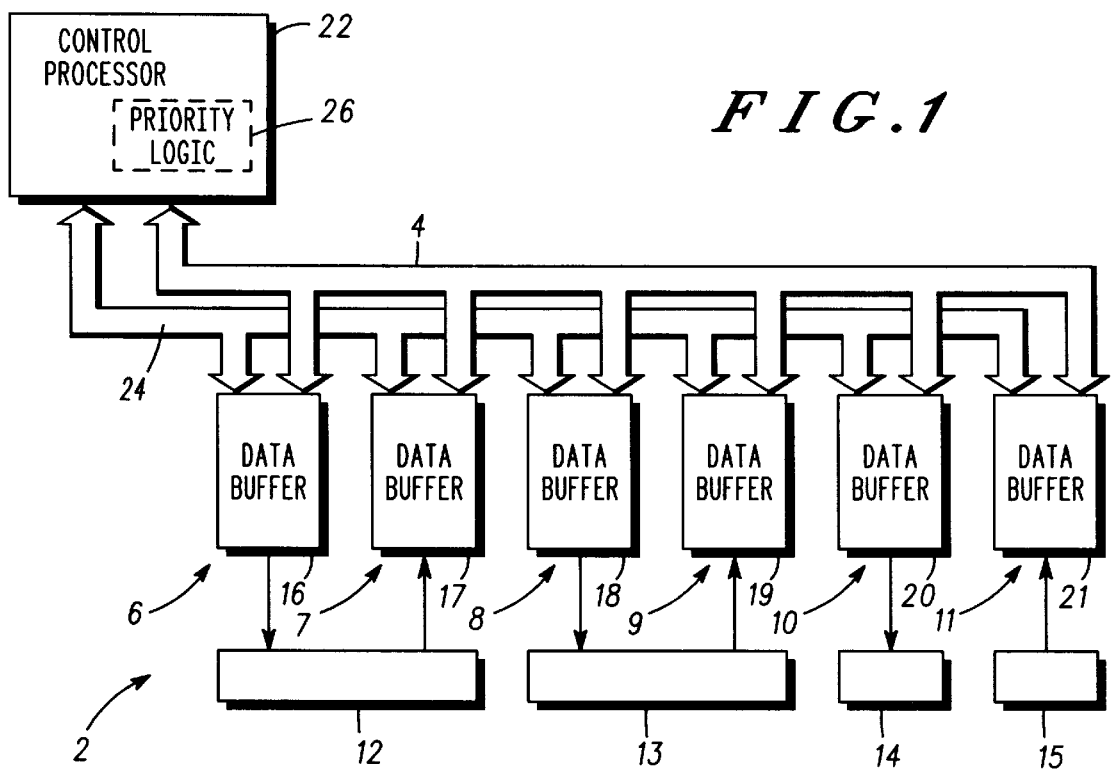
FIG. 1 is a block schematic diagram of a data communication system incorporating a preferred embodiment of the present invention.

Referring first to FIG. 1, a data communication system 2 incorporating a preferred embodiment of the present invention comprises a control processor 22, such as a RISC processor, coupled to a plurality of communication channels (only six (6–11) are illustrated herin) via a serial communication bus 4. Data is transferred between the serial communication bus 4 and respective devices 12, 13, 14, and 15 under the control of the control processor 22. The transfer may be in one direction only or two-directions as determined by the device. Depending on the system, the devices may include a modem, memory, input/output terminals. As shown in FIG. 1, the communication channels 6, 8, and 10 are transmitting communication channels in that they transmit data to the devices 12, 13 and 14 and communication channels 7, 9 and 11 are receiving channels in that they receive data from the devices 12, 13 and 14. The invention is not, however, limited to the arrangement of communication channels shown in FIG. 1.

Each communication channel comprises a data buffer 16–21 respectively for holding the data to be transferred between the serial communication bus 4 and a respective device 12–15. In the preferred embodiment, the data buffers are implemented using FIFO memory. The FIFO memory buffers of the plurality of communication channels in accordance with the present invention are all the same size regardless of the priority assigned to each communication channel and the data rate.

In operation, data is transferred simultaneously between the devices 12–15 and the respective FIFO memory buffers 16–21. Once a transmitting FIFO memory buffer 16, 18 or 20 has transmitted all the received data to the respective device, it requires servicing by the control processor 22 for data to be transferred from the communication bus 4 to the transmitting channel. Similarly, once a receiving FIFO memory buffer 17, 19 or 21 is full, it requires servicing by the control processor 22 so that the held data may be transmitted to the serial communication bus 4. The servicing scheme of the present invention will be described in detail below.

Figure 2:
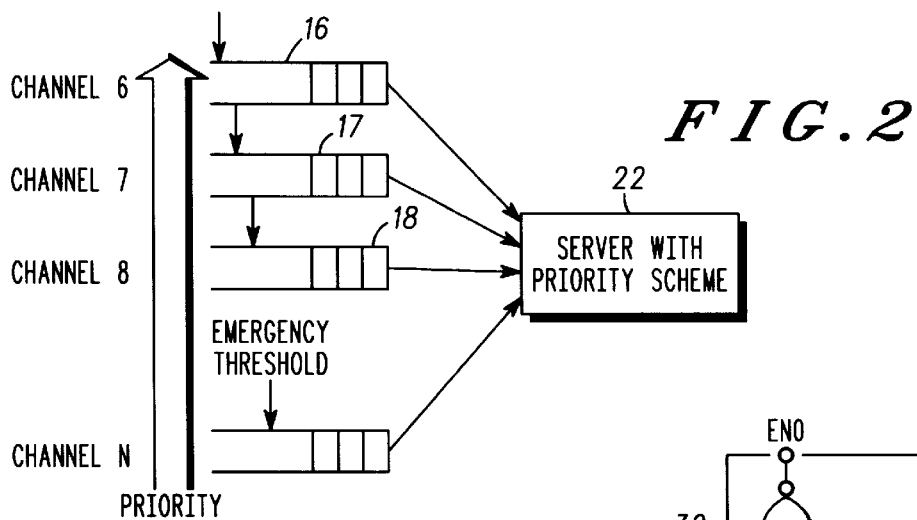
FIG. 2 is a representation of a priority scheme which is implemented in the preferred embodiment of a present invention.

Each one of the communication channels is assigned a priority level. As shown in FIG. 2, for a n-channel system, channel 6 is assigned a higher priority level than channel 7, etc. and channel n is assigned the lowest priority level. In the preferred embodiment, predetermined emergency threshold levels are also set for each FIFO memory buffer of each communication channel. The predetermined emergency threshold levels of the FIFO memory buffers are defined such that the level varies between communication channels: the lower priority communication channels have smaller emergency threshold levels than the higher priority communication channels. Preferably, the emergency threshold levels are staggered as shown in FIG. 2. In the preferred embodiment, the emergency threshold levels are programmable in order to allow for the adjustment of the architecture to a specific application.

Figure 3:
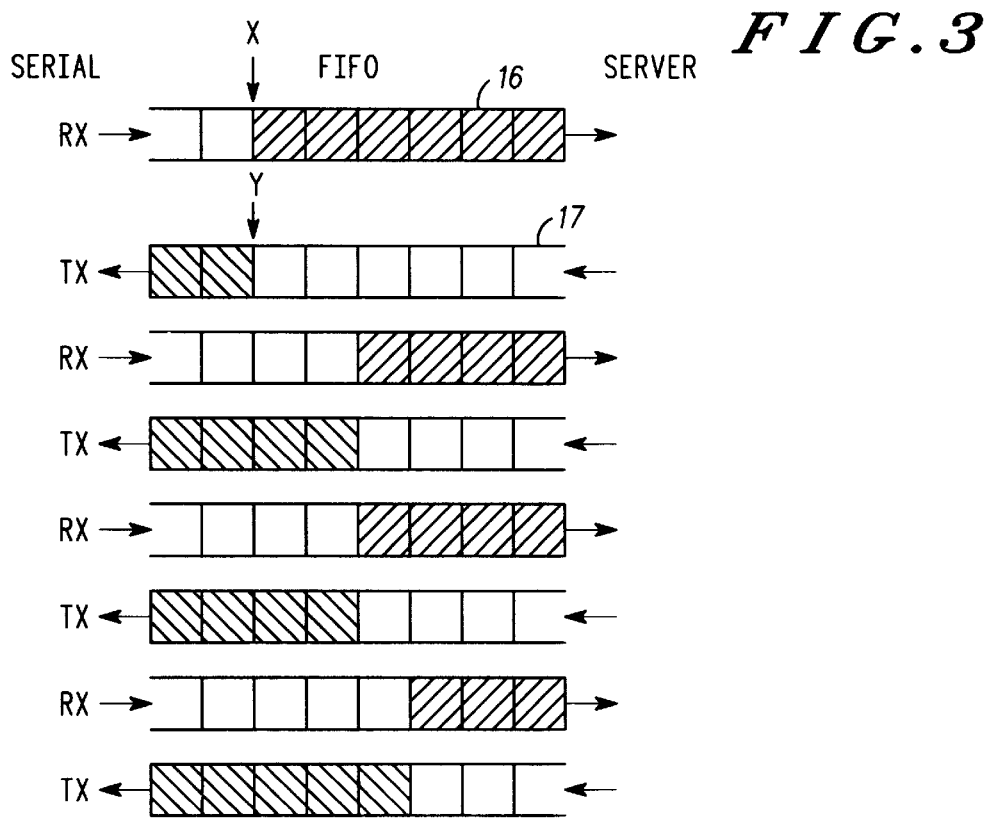
FIG. 3 is a schematic diagram of a plurality of data buffers, in accordance with the present invention, of a plurality of communication channels.

In operation, a communication channel (transmitting or receiving) generates a service request signal as soon as its FIFO memory buffer is not empty This is sent to the control processor 22 on control bus 24. Control bus 24 and serial communication bus 4 may be part of the same bus. Once the data transfer of the communication channel is such that the predetermined emergency threshold level of its FIFO memory buffer is reached, the communication channel enters an emergency state and generates an emergency signal. For a transmitting channel, such as channel 6, the emergency signal is generated when the number of empty entries in the communication channel's FIFO memory buffer exceeds the emergency threshold level of the buffer. For a receiving channel, such as channel 7, the emergency signal is generated when the number of full FIFO entries reaches the emergency threshold level of the buffer. The emergency threshold level of the transmitting FIFO memory buffer 16 is indicated at point X in FIG. 3 and the emergency threshold level of the receiving FIFO memory buffer 17 is indicated at point Y in FIG. 3. Thus, an emergency signal and service request signal are sent to the control processor 22 on bus 24 for all communication channels whose FIFO memory buffer count has reached its predefined emergency threshold level.

Priority logic 26 in the control processor 22 receives the emergency signals and determines which communication channel, of all the communication channels which have entered the emergency state, has the highest priority level. The control processor 22 in response to the priority logic 26 then services the highest priority communication channel that has entered the emergency state. Communication channels which are not in the emergency state do not participate in the arbitration for service. If none of the communication channels enter the emergency state, the arbitration for service is carried out normally using the assigned priority levels.

The emergency threshold levels are preferably staggered so that the lower priority communication channel will enter the emergency state earlier than a higher priority communication channel because the higher priority communication channel will be serviced faster once it enters the emergency state.

Figure 5:
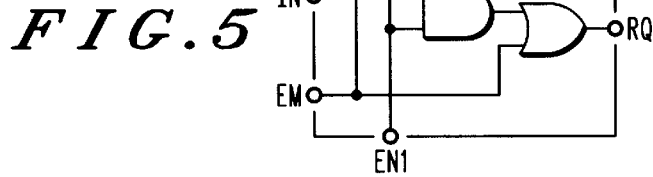
FIG. 5 is block diagram of an arbitration block of the priority logic of FIG. 4.
Figure 4:
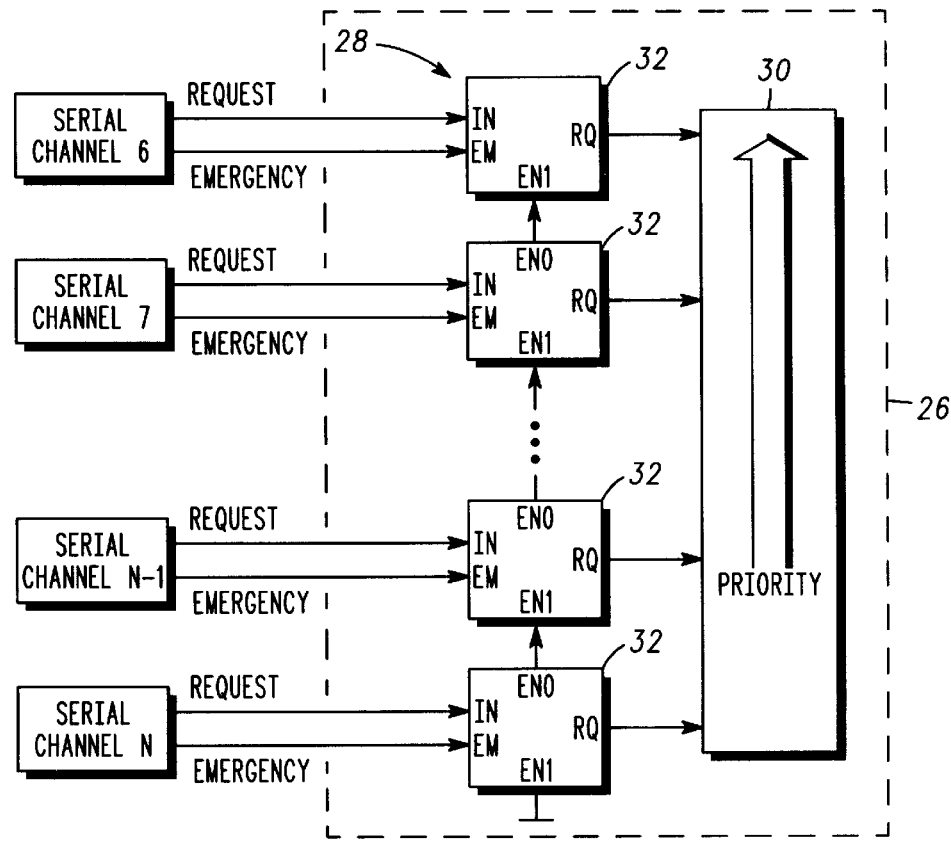
FIG. 4 is a block schematic diagram of a priority logic circuit in accordance with the present invention.

Priority logic 26, in accordance with a preferred embodiment of the invention, is shown in FIGS. 4 and 5. Priority logic 26 comprises arbitration logic 28 coupled to each of the plurality of communication channels to receive the emergency signals and the service request signals, and to a priority encoder 30. In the preferred embodiment, each communication channel generates an emergency signal having a first inactive logic state. On entering the emergency state, the emergency signal is switched to a second active logic state. The arbitration logic 28 determines which communication channels are in the emergency state by detecting emergency signals having the active state.

The arbitration logic 28 comprises n arbitration blocks 32 of logic gates coupled to the n communication channels. The arrangement of the logic gates in each arbitration block 32 is shown in FIG. 5. Each arbitration block 32 has two inputs, "in" and "em", for receiving the service request signal and emergency signal respectively, and an output "rq" which is coupled to the priority encoder 30. The plurality of arbitration blocks 32 are intercoupled by inhibit inputs "enI" and inhibit outputs "enO".

If none of the emergency signals received at the inputs "em" have the active state, each arbitration block 32 passes the service request signal at its input "in" transparently to its output "rq" and hence to the priority encoder 30. If at least one of the emergency signals has the active state, the respective arbitration block 32 inhibits all the arbitration blocks above it via its inhibit output "enO", except for those arbitration blocks which have also received emergency signals having the active state. The service request signals received by the inhibited arbitration blocks 32 are not coupled to the priority encoder 30. The service request signals, which are fed from the uninhibited arbitration blocks 32 to the priority encoder 30, are used by the priority encoder 30 to determine which communication channel of the emergency state communication channels should be serviced next.

In summary, the priority scheme in accordance with the present invention provides an improved scheme for prioritizing a plurality of communication channels in a data communication system, which efficiently reduces the occurrence of transmitter underrun or receive overrun. The priority scheme in accordance with the present invention improves the performance of the channels, but does not require significant silicon area to implement. Furthermore, the priority scheme can support different data rates and so is suitable for a large number of applications. In addition, all the communication channels can have the same design so that one design can be duplicated several times.

A further advantage of the priority scheme in accordance with the present invention is that it avoids the need for large FIFO memory buffers for the lower priority channels and thus, saves silicon area.

What we claim is:

1. A data processing system, comprising:
a plurality of communications channels, wherein:
each of the plurality of communications channels comprises a corresponding one of a plurality of data buffers,
each of the plurality of data buffers stores a plurality of data values,
each of the plurality of communications channels corresponds to one of a plurality of priority values, and
each of the plurality of data buffers corresponds to one of a plurality of emergency threshold values;
a plurality of service request circuits for providing a corresponding plurality of service request signals, wherein:
each of the plurality of service request circuits corresponds to one of the plurality of communications channels, and
each of the plurality of service request signals is selectively asserted when the corresponding one of the plurality of communications channel has data values to transmit;
a plurality of emergency signal circuits for providing a corresponding plurality of emergency request signals, wherein:
each of the plurality of emergency signal circuits corresponds to one of the plurality of communications channels, and
each of the plurality of emergency request signals is selectively asserted when a first level of data stored in a corresponding one of the plurality of data buffers is greater than a corresponding one of the plurality of emergency threshold values; and
a priority logic circuit coupled to each of the plurality of service request circuits for receiving each of the plurality of service request signals and coupled to each of the plurality of emergency signal circuits for receiving each of the plurality of emergency request signals, the priority logic circuit comparing each of the plurality of emergency request signals and each of the plurality of service request signals to provide a priority signal which indicates one of the plurality of communications channels with which a next one of the plurality of data values should be communicated.

2. The data processing system of claim 1 wherein a first one of the plurality of service request signals is asserted when an amount of data stored in a first data buffer is less than a corresponding service request level of data.

3. The data processing system of claim 2 wherein a first one of the plurality of emergency request signals is asserted when an amount of data stored in the first data buffer is greater than a corresponding emergency threshold value.

4. The data processing system of claim 1 wherein whenever a first one of the plurality of communications channels has a corresponding priority value different from a second one of the plurality of communications channels, then the one of the plurality of emergency threshold values that corresponds to one of the plurality of data buffers that corresponds to the first one of the plurality of communications channels differs from the one of the plurality of emergency threshold values that corresponds to one of the plurality of data buffers that corresponds to the second one of the plurality of communications channels.

5. The data processing system of claim 1 wherein the priority signal indicates a first one of the plurality of communications channels that comprises a data buffer that should be serviced when a corresponding one of the plurality of emergency request signals is asserted.

6. The data processing system of claim 5 wherein the first one of the plurality of communications channels has a highest priority of the plurality of communications channels for which corresponding ones of the plurality of emergency request signals are asserted.

7. The data processing system of claim 1 wherein the priority signal indicates a first one of the plurality of communications channels has a corresponding one of the plurality of data buffers that should be serviced when a corresponding one of the plurality of service request signals is asserted.

8. The data processing system of claim 7 wherein the first one of the plurality of communications channels has a highest priority of the plurality of communications channels for which corresponding ones of the plurality of service request signals are asserted.

9. The data processing system of claim 1 wherein:
the priority circuit is a daisy-chain circuit which includes a plurality of interconnected control elements, and
each of the plurality of interconnected control elements corresponds to a preselected one of the plurality of communications channels.

10. A method for controlling communication of data in a data processing system, comprising the steps of:
assigning a first priority level for a first data communication channel;
assigning a second priority level for a second data communication channel;
assigning a first emergency threshold level for a first data buffer included in the first data communication channel;
assigning a second emergency threshold level for a second data buffer included in the second data communication channel;
selectively asserting a first service request signal when the first data communication channel has data values to be transferred;
selectively asserting a second service request signal when the second data communication channel has data values to be transferred;
selectively asserting a first emergency signal when the first data communication channel stores a first plurality of data values which is greater than the first emergency threshold level;
selectively asserting a second emergency signal when the second data communication channel stores a second plurality of data values which is greater than the second emergency threshold level; and
comparing the first service request signal, the second service request signal, the first emergency signal, and the second emergency signal to determine a priority in which of the first data communication channel and the second data communication channel should be processed first.

11. A data processing system, comprising:
a plurality of communications channels, wherein:
   each of the plurality of communications channels comprises a corresponding one of a plurality of data buffers,
   each of the plurality of data buffers stores a plurality of data values,
   each of the plurality of communications channels corresponds to one of a plurality of priority values, and
   each of the plurality of data buffers corresponds to one of a plurality of emergency threshold values;
a plurality of service request circuits for providing a corresponding plurality of service request signals, wherein:
   each of the plurality of service request circuits corresponds to one of the plurality of communications channels, and
   each of the plurality of service request signals is selectively asserted when the corresponding one of the plurality of communications channel has data values to transmit;
a plurality of emergency signal circuits for providing a corresponding plurality of emergency request signals, wherein:
   each of the plurality of emergency signal circuits corresponds to one of the plurality of communications channels, and
   each of the plurality of emergency request signals is selectively asserted when a first level of data stored in a corresponding one of the plurality of data buffers is greater than a corresponding one of the plurality of emergency threshold values,
   the first level of data varies with a priority of a corresponding one of the plurality of data values; and
a priority logic circuit coupled to each of the plurality of service request circuits for receiving each of the plurality of service request signals and coupled to each of the plurality of emergency signal circuits for receiving each of the plurality of emergency request signals, the priority logic circuit comparing each of the plurality of emergency request signals and each of the plurality of service request signals to provide a priority signal which indicates one of the plurality of communications channels with which a next one of the plurality of data values should be communicated.

* * * * *